United States Patent [19]

Emi et al.

[11] Patent Number: 6,137,897
[45] Date of Patent: Oct. 24, 2000

[54] IMAGE FILING SYSTEM

[75] Inventors: Ryuichiro Emi, Kakogawa; Takeyoshi Fujiwara, Miki, both of Japan

[73] Assignee: Sysmex Corporation, Hyogo, Japan

[21] Appl. No.: 09/049,075

[22] Filed: Mar. 27, 1998

[30]   Foreign Application Priority Data

Mar. 28, 1997  [JP]  Japan .................................. 9-078026

[51] Int. Cl.⁷ ................................................ G06K 9/00
[52] U.S. Cl. .......................... 382/128; 382/133; 382/134
[58] Field of Search .................................. 382/128, 133, 382/134, 305, 306; 356/39; 707/200, 102, 104; 128/922; 345/348; 702/19

[56]             References Cited

U.S. PATENT DOCUMENTS

| | | | |
|---|---|---|---|
| 4,404,683 | 9/1983 | Kobayashi et al. ......................... | 382/6 |
| 5,235,522 | 8/1993 | Bacus ...................................... | 364/497 |
| 5,428,690 | 6/1995 | Bacus et al. ............................. | 382/128 |
| 5,553,277 | 9/1996 | Hirano et al. ............................ | 395/600 |
| 5,740,267 | 4/1998 | Echerer et al. ......................... | 382/132 |
| 5,751,286 | 5/1998 | Barber et al. ............................ | 345/348 |
| 5,828,776 | 10/1998 | Lee et al. ................................ | 382/133 |
| 5,859,934 | 1/1999 | Green ..................................... | 382/296 |

*Primary Examiner*—Andrew W. Johns
*Assistant Examiner*—Shervin Nakhjavan

[57]              ABSTRACT

An image filing system includes an image capturer, a data base for storing a plurality of images together with an attribute information of the images, a display device, an input device, a table memory, and a controller. The input device further includes a function of inputting differentiation count data of the object of inspection observed by an eye, and the controller further includes a function of allowing the inputted differentiation count data to be displayed on the display device together with the image of the object of inspection corresponding to the differentiation count data, retrieves from the table memory the attribute information corresponding to the identification number of an image now being displayed, and stores the image now being displayed into the data base together with the attribute information when an instruction to take in the image is given.

20 Claims, 5 Drawing Sheets

FIG. 2

SOFTWARE PROCESSING FUNCTIONS

| PROCESS | FUNCTION |
|---|---|
| DISPLAY SPECIMEN ATTRIBUTE | TAKE IN SPECIMEN ATTRIBUTE FROM DPS AND DISPLAY IT ON THE SCREEN |
| DISPLAY PATIENT ATTRIBUTE | TAKE IN PATIENT ATTRIBUTE FROM DPS AND DISPLAY IT ON THE SCREEN |
| DISPLAY SCATTERGRAM/PARTICLE SIZE DISTRIBUTION | TAKE IN SCATTERGRAM AND PARTICLE SIZE DISTRIBUTION FROM DPS AND DISPLAY THEM ON THE SCREEN |
| INPUT COMMENTS | TAKE IN TEXTS AND SKETCHES (INPUTTED FROM A TABLET) |
| TAKE IN MICROSCOPIC IMAGES | TAKE IN IMAGES FROM CCD CAMERA MOUNTED TO THE MICROSCOPE |
| TAKE IN IMAGE SCANNER IMAGES | TAKE IN IMAGES FROM IMAGE SCANNER CONNECTED TO THE MAIN BODY |
| TAKE IN FILM SCANNER IMAGES | TAKE IN IMAGES FROM FILM SCANNER CONNECTED TO THE MAIN BODY |
| OUTPUT DATA TO COLOR PRINTER | OUTPUT IMAGE DATA AND ATTRIBUTE DATA |
| DIFFERENTIAL COUNTER | PERFORM DIFFERENTIAL COUNT USING KEYBOARD OF THE MAIN BODY AND TRANSMIT DATA TO DPS |
| BACKUP | BACKUP BY AN EXTERNAL STORAGE DEVICE OF GREAT CAPACITY IS POSSIBLE |
| DPS ON-LINE | PERFORM ON-LINE CONNECTION WITH DPS-2000 SERIES AND PC-DPS |
| DISPLAY PATIENT IMAGE DATA IN TIME SERIES | RETRIEVE IMAGE DATA OF THE PAST OF THE PATIENT BY USING THE PATIENT NUMBER ON THE INSPECTION WORK SCREEN AS A KEY AND DISPLAY THEM IN A LIST |
| REGISTER DATA IN THE DATA BASE | REGISTER IMAGES TAKEN IN, DATA, AND COMMENTS IN THE DATA BASE |
| DELETE DATA IN THE DATA BASE | DELETE RECORDS INCLUDING THE DESIGNATED IMAGES FROM THE DATA BASE |
| RETRIEVE DATA IN THE DATA BASE | RETRIVE DATA IN THE DATA BASE BY USING THE INSPECTION DATA, SPECIMEN NUMBER, ACCESS NUMBER, PATIENT NUMBER, PATIENT NAME, DIFFERENTIAL NAME, AND DISEASE AS A KEY |
| MAINTENANCE | ESTABLISH VARIOUS SETTINGS OF THE SYSTEM AND THE APPLICATION SOFTWARE |

IMAGE FILING SYSTEM

CROSS-REFERENCES TO RELATED APPLICATIONS

This application is related to Japanese Patent Application No. HEI 09-078026 filed on Mar. 28, 1997 whose priority is claimed under 35 USC § 119, the disclosure of which is incorporated herein by reference in its entirety.

BACKGROUND OF THE INVENTION

1. Field of the Invention

The present invention relates to an image filing system; more particularly, it relates to an image filing system for digitizing an image such as a blood cell taken in by means of a microscope and filing the image with attribute information.

2. Description of the Related Arts

Generally, a method often referred to as "microscopy" is employed for inspection of blood cells. This is a method in which a blood, as an object of inspection, is mounted on a slide glass and is inspected by eye observation of the blood through a microscope.

This inspection generally involves differentiating and counting leukocytes, which are present in a prescribed region, by means of a differential counter. When an operator finds an erythrocyte or platelet having an abnormal shape during the differential counting work, the operator captures the image of the abnormal cell by means of a video camera or the like mounted on the microscope. The operator then files the image into a database of an image filing system together with an attribute information of the object of inspection, such as the card number, name, age, sex and date. After the inspection, the operator prints out the result of differential count and, upon necessity, prints out an image of the abnormal blood cell as a result of inspection.

Also, in the prior art image filing system, if a need arises for making a reference to a blood image of the past of the object of inspection which is now being subjected to counting during the differential counting work, the operator has to stop the differential counting work for a while for recalling the blood images of the past by opening a retrieval screen of the image filing system and inputting the attribute information of the object of inspection.

Further, in order to transfer the object of inspection, the operator has to transfer a stage having a slide glass mounted thereon relative to the microscope.

However, in such an inspection of blood cells, it often happens that the image which the operator wishes to file is found during the differential counting operation. According to the prior art, the differential counting work is conducted by means of a single-purpose differentiation table, and the microscopic images are taken in by operating a terminal keyboard of the image filing system. This involves separation of the operation system into two subsystems, raising a problem of poor efficiency. Moreover, in filing the image of the object of inspection, the operator has to perform additional work such as inputting an identification information of the object of inspection again on the image filing system side, although the identification information has already been inputted on the differentiation table side.

Also, if a reference is to be made to a blood image of the past of the object of inspection, the operator has to input an identification information of the object of inspection again on the image filing system side for retrieval of the data base, although the identification information has already been inputted on the differentiation table side.

Further, if a microscopic image is to be taken into a video camera, it is not possible to control the stage of the slide glass on the image filing system side because the display of the image filing system merely displays the microscopic image.

SUMMARY OF THE INVENTION

The present invention has been made in view of these circumstances and the purpose thereof is to provide an image filing system in which the image filing system comprises a differential counter function; image data of the past of the object of inspection can be recalled without inputting the identification information again during the differential counting work; and further the stage of the microscope can be controlled simply by giving an instruction on the screen on which the image is displayed, whereby the working efficiency of the blood cell inspection is improved.

Accordingly, the present invention provides an image filing system comprising: an image capturer for allowing an operator to observe an object of inspection by eye, capturing an image of the object of inspection for conversion into an image signal, and outputting the image signal; a data base for storing a plurality of images together with an attribute information of the images; display means for displaying an image; input means for inputting an identification code of the object of inspection and giving an instruction to take in an image; a memory for storing a table that correlates the identification code to the attribute information; and a controller for receiving the image signal outputted from the image capturer, creating an image based on the received image signal, and allowing the created image to be displayed on the display means, wherein the input means further comprises a function of inputting differentiation count data of the object of inspection observed by an eye, and the controller further comprises a function of allowing the inputted differentiation count data to be displayed on the display means together with the image of the object of inspection corresponding to the differentiation count data, retrieves from the memory the attribute information corresponding to the identification code of an image now being displayed, and stores the image now being displayed into the data base together with the attribute information when an instruction to take in the image is given.

BRIEF DESCRIPTION OF THE DRAWINGS

The present invention will be better understood from the following detailed description of preferred embodiments of the invention, taken in conjunction with the accompanying drawings, in which:

FIG. 2 is an explanatory view showing a list of software processing functions of the blood cell image filing system according to the present invention;

DETAILED DESCRIPTION OF THE PREFERRED EMBODIMENTS

The present invention provides, in one aspect, an image filing system comprising: an image capturer for allowing an operator to observe an object of inspection by eye, capturing an image of the object of inspection for conversion into an image signal, and outputting the image signal; a data base for storing a plurality of images together with an attribute information of the images; display means for displaying an image; input means for inputting an identification code of the object of inspection and giving an instruction to take in an image; a memory for storing a table that correlates the identification code to the attribute information; and a controller for receiving the image signal outputted from the image capturer, creating an image based on the received image signal, and allowing the created image to be displayed on the display means, wherein the input means further comprises a function of inputting differentiation count data of the object of inspection observed by an eye, and the controller further comprises a function of allowing the inputted differentiation count data to be displayed on the display means together with the image of the object of inspection corresponding to the differentiation count data, retrieves from the memory the attribute information corresponding to the identification code of an image now being displayed, and stores the image now being displayed into the data base together with the attribute information when an instruction to take in the image is given.

According to the present invention, it is possible to successively perform a differentiating work and a work of taking in an image because the image filing system of the invention includes a function of inputting and displaying differentiation count data of the object of inspection. Further, when an instruction to take in an image is given, the image to be taken in is stored into the data base together with the attribute information corresponding to the identification code of the image. Since it is not necessary to input the attribute information, the working efficiency can be increased.

The present invention provides, in another aspect, an image filing system comprising: an image capturer for allowing an operator to observe an object of inspection by eye, capturing an image of the object of inspection for conversion into an image signal, and outputting the image signal; a data base for storing a plurality of images together with an attribute information of the images; display means for displaying an image; input means for inputting an identification code of the object of inspection and giving an instruction to retrieve and display an image; a memory for storing a table that correlates the identification code to the attribute information; and a controller for receiving the image signal outputted from the image capturer, creating an image based on the received image signal, and allowing the created image to be displayed on the display means, wherein the controller retrieves from the memory the attribute information corresponding to the identification code of an image now being displayed, retrieves from the data base an image having the retrieved attribute information, and allows the retrieved image to be displayed on the display means when an instruction to retrieve and display the image is given.

In the above construction, it is preferable that the input means further comprises a function of inputting differentiation count data of the object of inspection observed by an eye, and the controller further comprises a function of allowing the inputted differentiation count data to be displayed on the display means together with the image of the object of inspection corresponding to the differentiation count data.

The present invention provides, in still another aspect, an image filing system comprising: an image capturer for allowing an operator to observe an object of inspection by eye, capturing an image of the object of inspection for conversion into an image signal, and outputting the image signal; a data base for storing a plurality of images together with an attribute information of the images; display means for displaying an image; input means for inputting an identification code of the object of inspection and giving an instruction to take in an image; a memory for storing a table that correlates the identification code to the attribute information; and a controller for receiving the image signal outputted from the image capturer, creating an image based on the received image signal, and allowing the created image to be displayed on the display means, wherein the image capturer further comprises transfer means for transferring the object of inspection, the input means further comprises a function of designating a transfer direction of the transfer means, and the controller further comprises a function of controlling the transfer means to transfer the object of inspection in the transfer direction designated by the input means.

In the present invention, the object of inspection may include blood cells and various cells contained in a blood, various cells contained in a urine, organic or inorganic particles, or the like.

The identification code of the object of inspection may be formed of a bar code, letters for OCR, ordinary letters, symbols, special symbols, numbers or the like and, specifically, may include a specimen number attached to a vessel containing a blood or the like.

The attribute information may comprise an attribute information of a patient including a patient number, patient name, sex, age, blood type, ward, clinical branch, name of disease, comments on the patient, past history of the patient, doctor in charge of the patient, clinical observation and the like, and an attribute information of a specimen including a specimen number, access number, collection date, specimen type, comments on the specimen and the like.

The image capturer may be a CCD image sensor, a commercially available video camera, or the like mounted on an ordinary microscope.

As the data base, those capable of storing a plurality of images together with attribute information of the images, such as a card number, name, age, sex, date, and the like may be used. Preferable examples of the data base include hard disk devices, magneto-optical disk devices, and the like recording media into which data can be written.

The display means may be one of various display devices such as a CRT display device or a plasma display device. The input means may be a pointing device such as a mouse or an input device such as a keyboard.

As the memory, those capable of storing a table which correlates the identification code to the attribute information may be used, Preferable examples of the memory include a RAM and a floppy disk device.

Alternatively, the memory may be a DPS (Data Processing System) of a hospital if the image filing system of the present invention is provided in the hospital. Here, the DPS is a system for management of patients and stores information of each patient such as the patient number, patient name, sex, age, blood type, the ward, the clinical branch, name of the disease, history of the patient, the doctor in charge of the patient, clinical observation, and the like. Accordingly, the DPS stores the date of inspection, specimen number, access number, collection date, specimen type, comments on the specimen, and the like. Therefore, by connecting the image filing system of the present invention with the DPS and inputting an identification code such as a specimen number on the side of the image filing system, attribute information of the patient corresponding to the specimen number can be obtained from the DPS. Thus, the DPS can be used as the memory.

The controller may be a microcomputer provided with a CPU, a ROM, a RAM, and an I/O port.

Preferable embodiments of the present invention are now detailed with reference to the attached drawings. However, these embodiments are not intended to limit the scope of the present invention.

In the following embodiments, the image filing system of the present invention is applied to a filing system for blood cell images. However, the image filing system can also be applied to a filing system for various cell images, particle images, or the like.

Figure 1:
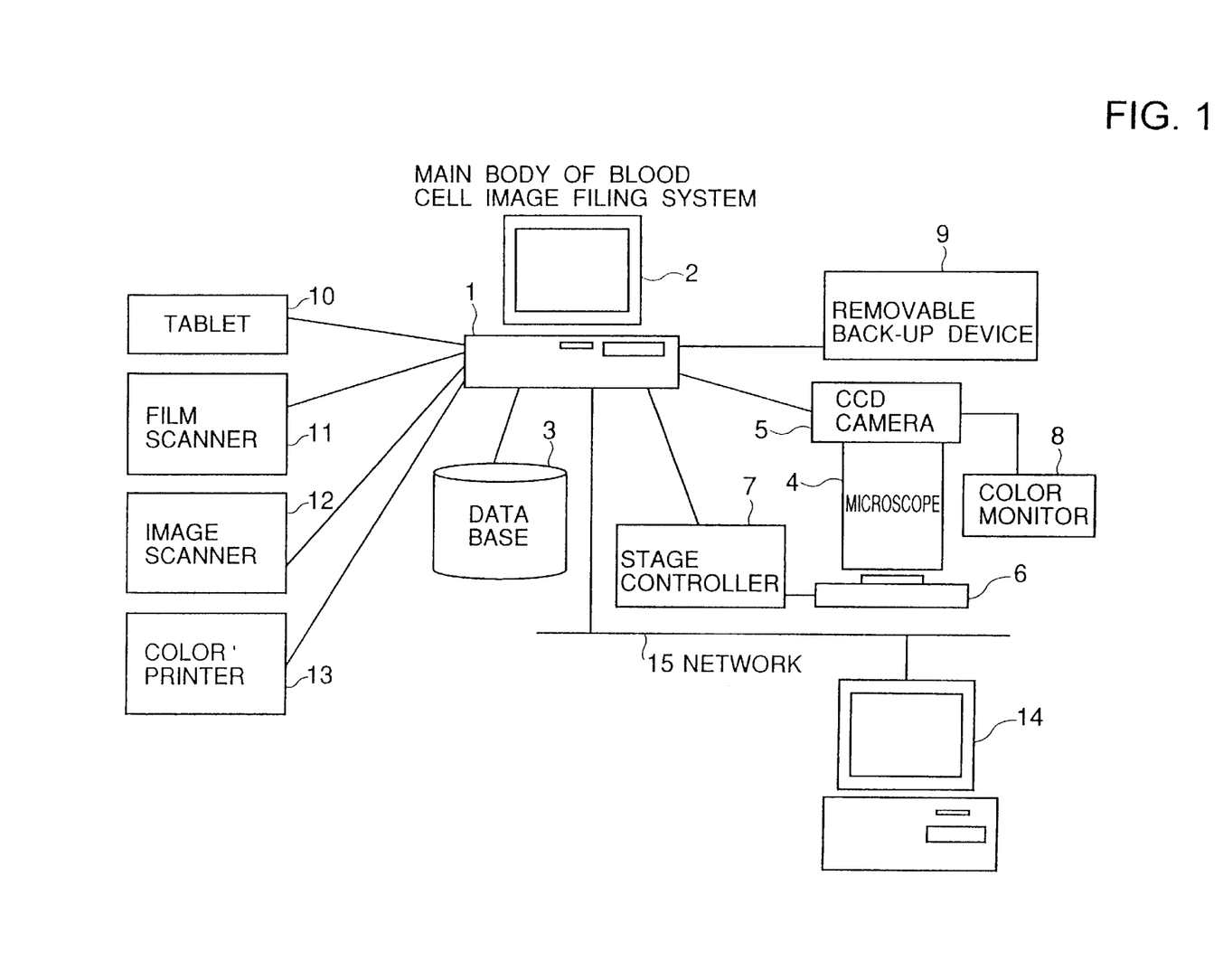
FIG. 1 is a block diagram showing a construction of a blood cell image filing system according to the present invention.

FIG. 1 is a block diagram showing a construction of a blood cell image filing system which digitizes blood cell images taken in from the microscope and files the images together with their attribute information.

Referring to FIG. 1, reference numeral 1 represents a main body of the blood cell image filing system; 2 is a display device provided in the main body 1 and comprising a CRT display device; 3 is a data base provided in the main body 1 and comprising a hard disk device capable of arbitrarily storing various blood cell images; 4 is a microscope for enlarging and observing the images of blood cells; 5 is a CCD camera mounted on the microscope 4; 6 is a stage for mounting a slide glass on which a collected blood sample is placed; 7 is a stage controller for controlling the stage 6 upon receipt of instructions from the main body 1; 8 is a color monitor comprising a full color CRT display device; 9 is a removable backup device; 10 is a tablet; 11 is a film scanner; 12 is an image scanner; 13 is a color printer; 14 is a DPS (Data Processing System); and 15 is a network comprising a single-purpose line, telephone line, or the like for connecting the main body 1 with the DPS 14. A keyboard and a mouse (not shown) are provided as an input device in the main body 1 of the image filing system.

The stage 6 may be transferred in the front and rear directions and in the right and left directions by the control from the stage controller. A mechanism known in the art is employed for transferring the stage 6 in these directions. The main body 1 and the DPS 14 may be disposed adjacent to each other or, alternatively, at different locations such as a blood inspection laboratory and a hospital.

The DPS 14 is a system installed in a hospital for management of patients and stores attribute information of each patient (patient attribute) such as the patient number, patient name, sex, age, and blood type, the ward, the clinical branch, name of the disease, comments on the patient, past history of the patient, the doctor in charge of the patient, clinical observation, and the like. If a blood inspection is carried out on a patient, the DPS 14 stores attribute information of each specimen (specimen attribute) such as the date of blood inspection, specimen number, access number, collection date, specimen type, comments on the specimen, and the like.

This provides that, by inputting an identification number (code) of a blood to be inspected, for example, a specimen number (a serial number assigned to a vessel containing the collected blood) on the side of the main body 1 of the blood cell image filing system, the operator can obtain the patient attribute and the specimen attribute corresponding to the specimen number from the DSP 14. Here, the operator can select and obtain specific items of the attribute information which are needed for filing the blood cell images on the side of the main body 1.

Thus, the DPS 14 includes a function as a table memory for correlating the identification number such as a specimen number for conducting the blood inspection with the attribute information such as the patient number, patient name, sex, age, and blood type.

The image data of the blood cells taken in with the CCD camera 5, the film scanner 11 or the image scanner 12 are filed into the data base 3 of the main body 1 together with the attribute information taken in from the DPS 14. The attribute information to be stored together with the image data in filing includes the specimen attribute and the patient attribute. In this embodiment, the attributes to be stored include such items as the date of inspection, specimen number, the access number, collection date, specimen type, comments on the specimen, patient number, patient name, sex, age, blood type, the ward, the clinical branch, name of the disease, comments on the patient, differentiation name, and comments on the images. In the main body 1, the operator can retrieve desired image data from the data base 3 by using one or more of these attribute information items as a key code.

The main body 1 can be used as a differential counter by employing the keyboard of the main body 1. The results of count and the comments are sent to the DPS 14. The data stored in the blood cell image filing system can be printed by means of the color printer 13.

As described above, the blood cell image filing system includes a function as a differential counter. By employing this differential counter function, the operator can conduct an inspection work on blood cells by employing a method called "microscopy".

FIG. 2 shows a list of software processing functions in the blood cell image filing system. Referring to FIG. 2, the blood cell image filing system includes processing functions of: displaying the specimen attribute, displaying the patient attribute, displaying the scattergram/particle size distribution, inputting comments, taking in microscopic images, taking in image scanner images, taking in film scanner images, outputting the data to the color printer, performing the differential counting operation, performing the backup, performing the on-line connection with the DPS, displaying the patient data in time series, registering data in the data base, deleting data in the data base, retrieving data in the data base, and performing the maintenance operation.

These processing functions are hereafter explained by classifying them into two kinds, namely, the inspection work functions and the image listing functions.

(1) The inspection work functions include:
   taking in the blood cell image data of the specimen and registering them into the data base 3,
   performing the differential counting operation on the specimen and registering the result of differential count into the DPS 14,
   displaying the previous image data of the patient now being inspected,
   making an inquiry to the DPS 14 about the scattergram and the particle size distribution of the specimen now being inspected and displaying them on the screen,
   displaying the result of inspection and the result of differential count of the specimen now being inspected,
   displaying the detailed images and adding comments thereto, and
   displaying the microscopic images on a monitor.

(2) The image listing functions include:
   displaying a list of the image data base, retrieving data in the image data base by designated items, deleting the selected images, changing the attribute of the selected images, displaying the previous image data of the patient of the selected image data, making an inquiry to the DPS 14 about the scattergram and the particle size distribution of the specimen of the selected image data, making an inquiry to the DPS 14 about the result of inspection and the result of differential count of the selected image data and displaying them on the screen, displaying the inspection result log of the selected image data, and displaying the detailed images of the selected image data.

Among these work functions, the inspection work functions are now explained in detail.

Figure 3:
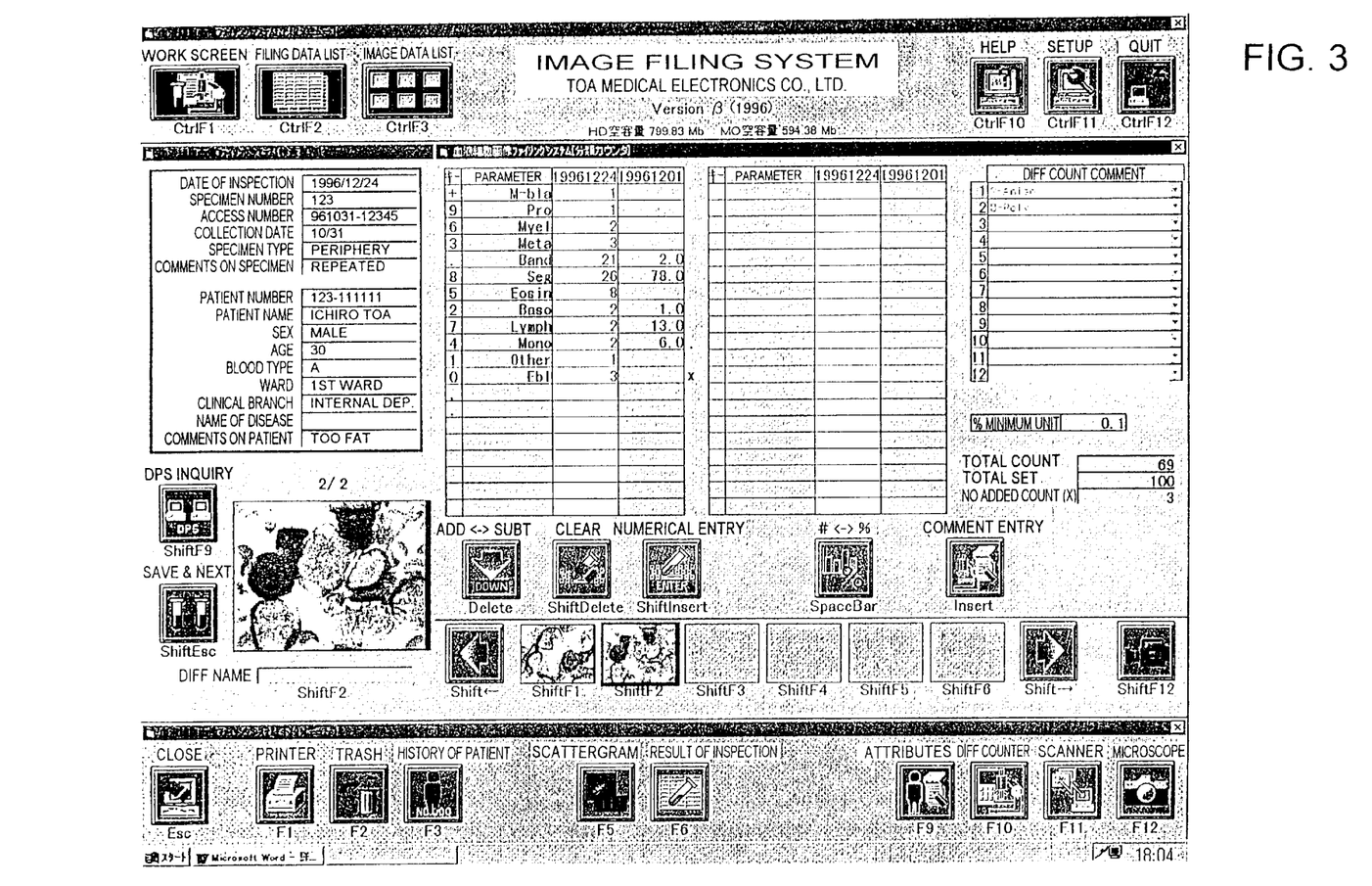
FIG. 3 is an explanatory view showing an exemplary display screen of the differential count data during the inspection work according to the present invention.

FIG. 3 is an explanatory view showing an exemplary display screen of the differential count data during the inspection work. Referring to FIG. 3, the display screen during the inspection work includes an attribute display area 21, a cell display area, and a differential counter display area 23. The attribute display area 21 displays attribute information of the person now being inspected, which has been obtained from the DPS 14. The cell display area 22 displays a blood cell image captured by the CCD 3. The differential counter display area 23 displays differential count values in inspection.

In the blood cell image filing system, images taken in from the CCD camera 5 are filed into the data base 3 together with the attribute information. In doing this, not all the observed blood cells are filed; only the specific cells selected by the operator are filed.

In other words, when the operator performs an inspection work on blood cells by employing a method called "microscopy" using the differential counter function as described above in this blood cell image filing system, the operator collects a blood to be inspected on a slide glass and inputs a leukocyte type by means of the keyboard of the main body 1, while confirming the blood cells in a predetermined region by eye inspection through a microscope.

For this input, the keys of "0" to "9", "." (period), and "+" on the keyboard each correspond to one leukocyte type. The operator presses one of these keys depending on the leukocyte type. For example, the operator presses the "+" key once when finding an M-bla (monoblast), the "9" key once when finding a Pro (promyelocyte), and the "6" key once when finding a Myel (myeloblast). Thus, the operator can perform differential counting work by employing the same operation as in the conventional differential counter. In this way, the count value is displayed in real time on the differential counter display area 23 every time the operator presses one of the keys.

The operator counts leukocytes which are present in a predetermined region by performing such a microscopy operation. Here, when an operator finds a morphological abnormality in an erythrocyte or a platelet during the differential counting work, the operator can file the image of the abnormal cell into the data base 3 of the main body 1 together with the attribute information while performing the differential counting work.

For filing the images, a function of "microscopic take-in" is assigned to one of the function keys on the keyboard of the main body 1. When the operator finds an abnormal cell which should be stored, the operator presses the "microscopic take-in" function key to store the blood cell image into the data base 3 while observing the abnormal blood cell displayed on the cell display area 22 located near the differential counter display area 23. Since the image of the abnormal cell has already been captured by the CCD camera 5 and is displayed on the cell display area 22 at the time when the abnormal cell is found, the image of the blood cell displayed on the cell display area 22 is filed into the data base 3 together with the attribute information.

The keyboard of the main body 1 in the blood cell image filing system incorporates therein scroll keys for front and rear directions and for right and left directions. The operator can transfer the stage 6 of the microscope 4 in the front and rear directions and in the right and left directions via the stage controller 7 by means of these scroll keys, whereby the operator can transfer the slide glass on the stage 6 to an arbitrary position.

Thus, the operator can transfer the slide glass by sending a simple command to the stage controller 7 of the stage 6 mounted on the microscope 4 from the side of the blood cell image filing system.

This allows the operator to scan the slide glass for close inspection easily with a sense of scrolling the screen without operating a control box for the microscope as in conventional cases. Therefore, the operation in the inspection work is extremely easy to understand, and the operator can operate the stage with ease even if the control box for the microscope is located at a remote position, such as in the case of conducting a remote inspection.

Figure 4:
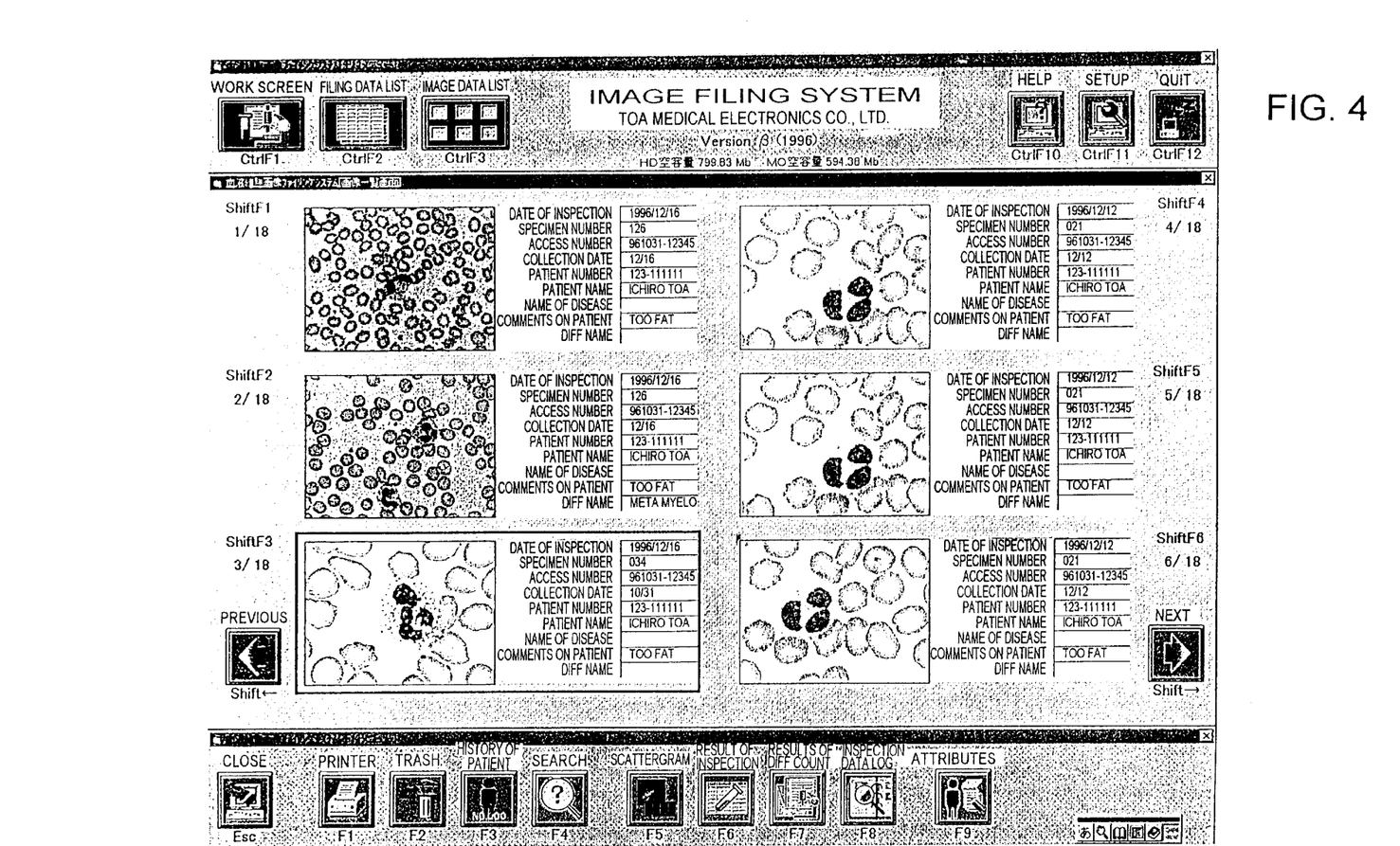
FIG. 4 is an explanatory view showing an exemplary display screen of images of the past of a person to be inspected during the inspection work according to the present invention.

FIG. 4 is an explanatory view for showing an exemplary display screen of the images of the past of the person being inspected during the inspection work.

Referring to FIG. 4, six screen display areas 24 to 29 are provided for displaying the images of the past of the person being inspected. At the right hand side of each image, there are displayed: the inspection date, specimen number, access number, collection date, patient number, patient name, name of the disease, comments on the patient, and the differential name as the attribute information of the person being inspected.

In this display example, the latest six images among the eighteen images of the past of the person being inspected are now on display.

This display of the images of the past can be performed during the inspection work for differential counting. In that case, the operator can easily display on the screen the list of images of the past of the person being inspected simply by pointing at a portion of the display screen by means of a mouse without designating the attribute information again, since the attribute information of the object of inspection has already been obtained from the DPS 14.

Thus, the operator can make reference to the image data of the past of the person being inspected in order to determine what blood cells should be observed carefully in conducting the inspection work of differential counting.

Here, since the image data are filed together with the attribute data, it is possible to retrieve desired image data from the data base 3 at any time by using, as a key code, one or more items in the attribute information such as the inspection date, specimen number, access number, collection date, specimen type, comments on the specimen, patient number, the name, sex, age, and blood type of the patient, the ward, the clinical branch, name of the disease, comments on the patient, the differential name, and comments on the image, even if the differential counting work is not being performed.

Figure 5:
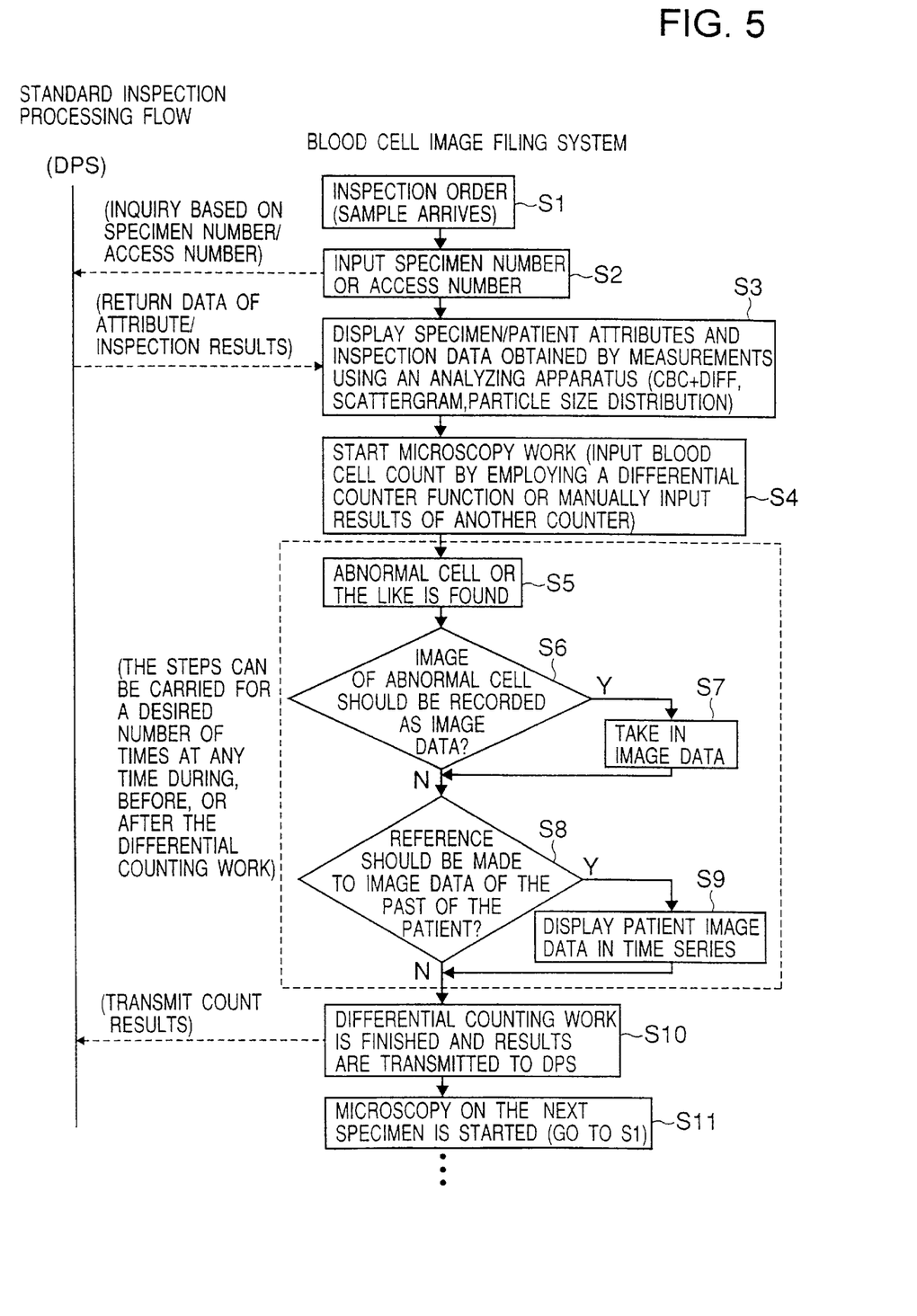
FIG. 5 is a flow chart showing processing steps in a standard inspection work according to the present invention.

FIG. 5 is a flow chart showing the processing steps in a standard inspection work. Hereafter, the processing steps for the inspection work are explained with reference to the flow chart given in FIG. 5.

In the inspection work, when an order for microscopy is given and a sample arrives on the side of the blood cell image filing system (step S1), a specimen number or an access number is inputted (step S2). By this order, the blood cell image filing system makes an inquiry to the DPS 14 on the basis of the specimen number/access number, whereupon the data of attribute/inspection results are returned from the DPS 14 to the blood cell image filing system.

On receiving the data from the DPS 14, the blood cell image filing system displays the specimen/patient attributes and the inspection data obtained by measurements using an analyzing apparatus (step S3). At this time, it is possible to display a scattergram or a particle size distribution by taking them in from the DPS 14.

The operator starts the microscopy work (step S4). Namely, the blood cell count is inputted by employing a differential counter function, or the results of another counter are manually inputted. Here, if an abnormal cell or the like is found by the operator (step S5), the operator determines whether the image of the abnormal cell should be recorded as the image data (step S6). If the image is to be recorded as the image data, the operator takes in the image data (step S7). If the operator determines that a reference should be made to the image data of the past of the person being inspected (step S8), the operator retrieves the image data of the patient to display them on the screen in time series from the latest image data (step S9).

These steps S5 to S9 can be carried out for a desired number of times at any time during, before, or after the differential counting work. When the differential counting work is finished, the results are transmitted to the DPS 14 (step S10) and microscopy on the next specimen is started (step S11).

Thus, it is possible to perform both the differential counting work and the work of taking in the blood cell images seamlessly by mounting a differential counter function onto a blood cell image filing system so that the microscopic work can be carried out using the terminal keyboard. Also, the inspection work can be made more efficient because the attribute or the like must be inputted only once. This also contributes to saving the space needed for the inspection. Further, since the blood cell image filing system is connected to the DPS, reference can be made to the attribute information of the patient/specimen, the information on the result of inspection, and the like together with the images during the microscopy work, so that it is possible to construct an extremely powerful information system.

Also, since the blood cell image filing system is provided with command buttons such as function keys, the data base can be automatically retrieved by pressing the command buttons using, as a key, the patient number of the specimen being inspected, whereby the image data of the past of the patient can be collected and displayed on the screen. This eliminates the need for inputting the patient number again and, since the data of the past of the patient can be recalled by one-touch operation from any screen, the diagnosis work can be made more efficient.

Also, since scroll keys for the front and rear directions and the right and left directions are provided on the keyboard of the blood cell image filing system, it is possible to transfer the stage of the microscope for moving the slide glass by pressing the scroll keys, so that the slide glass can be scanned for close inspection easily with a sense of scrolling the screen. This makes the operations in the inspection work easy to understand and the stage can be operated with ease even if the microscope is located at a remote place such as in the case of conducting a remote clinical observation.

According to the present invention, a function of inputting the differentiation count data is added to the image filing system so that the image now on display, which is an object of inputting the differentiation count data, is stored into the data base together with the automatically retrieved attribute information. This eliminates the need for inputting the attribute information again, and both the work of inputting the differentiation count data and the work of taking in the images can be performed successively, whereby the work can be made more efficient.

Also, when a command for retrieving and displaying the images is given in the blood cell image filing system of the present invention, the images corresponding to the identification number of the image now on display are automatically retrieved from the data base and displayed on the screen. This eliminates the need for inputting the key code again for retrieving the images, and the images of the past can be recalled easily from any displayed screen, so that the work of confirming the images can be made more efficient.

Further, since the present invention allows the object of inspection to be transferred in a transfer direction designated by the input device, the object of inspection can be transferred easily with a sense of scrolling the screen. This makes the operations in the inspection work, such as the differential counting work, easy to understand and the object of inspection can be transferred with ease even if the image capturer is located at a remote place.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An image filing system comprising:

an image capturer, for visual inspection of an object by directly viewing an object, and for capturing and converting an image of the visually inspected object into an image signal, and for outputting the image signal;

a data base for storing a plurality of images together with attribute information of the images;

a display for displaying an image;

an input device for inputting an identification code relating to the visually inspected object and for inputting an instruction for instructing the image capturer to capture an image of the visually inspected object;

a memory for storing information correlating the identification code to the attribute information; and a controller for receiving the image signal outputted from the image capturer, creating an image based on the received image signal, and controlling the display to display the created image, wherein the input device is further for inputting differentiation count data of the visually inspected object, and the controller further controls the display to display the inputted differentiation count data together with the image of the visually inspected object corresponding to the differentiation count data, retrieves from the memory the attribute information corresponding to the identification code of the image being displayed, and stores the image being displayed into the data base together with the attribute information when an instruction to capture the image is input.

2. The image filing system of claim 1, wherein the object being visually inspected is blood.

3. The image filing system of claim 2, wherein the input device inputs an instruction to capture an image of an abnormal cell during input of differentiation count data.

4. The image filing system of claim 2, wherein the image capturer includes a microscope portion for direct viewing of the object.

5. The image filing system of claim 1, wherein the identification code of the visually inspected object includes a specimen number, which is attached to a vessel containing blood.

6. The image filing system of claim 1, wherein the attribute information includes attribute information of a patient including at least one of a patient number, patient name, sex, age, blood type, ward, clinical branch, name of disease, comments on the patient, past history of the patient, doctor in charge of the patient, clinical observation, and an attribute information of a specimen including at least one of a specimen number access number, collection date, specimen type, and comments on the specimen.

7. The image filing system of claim 1, wherein the differentiation count data includes classified counts of cells contained in a predetermined amount of blood, the classified counts being obtained from a differentiation counter.

8. The image filing system of claim 7, wherein the input device inputs an instruction to capture an image of an abnormal cell during input of differentiation count data.

9. The image filing system of claim 1, wherein the image capturer includes a CCD image sensor.

10. The image filing system of claim 9, wherein the image capturer includes a microscope portion for direct viewing of the object.

11. The image filing system of claim 1, wherein the input device inputs an instruction to capture an image of an abnormal cell during input of differentiation count data.

12. The image filing system of claim 1, wherein the image capturer includes a microscope portion for direct viewing of the object.

13. An image filing system comprising:
   an image capturer, for visual inspection of an object by directly viewing the object, and for capturing and converting an image of the visually inspected object into an image signal, and for outputting the image signal;
   a data base for storing a plurality of images together with attribute information of the images;
   a display for displaying an image;
   an input device for inputting an identification code relating to the visually inspected object and for inputting an instruction to retrieve and display an image;
   a memory for storing information correlating the identification code to the attribute information; and
   a controller for receiving the image signal outputted from the image capturer, creating an image based on the received image signal, and controlling the display to display the created image,
   wherein the controller retrieves from the memory the attribute information corresponding to the identification code of an image being displayed, retrieves from the data base an image having the retrieved attribute information, and controls the display to display the retrieved image when an instruction to retrieve and display the image is input.

14. The image filing system of claim 13, wherein the input device further comprises a function of inputting differentiation count data of the visually inspected object, and the controller further controls the display to display the inputted differentiation count data together with the visually inspected image of the object corresponding to the differentiation count data.

15. The image filing system of claim 14, wherein the differentiation count data includes classified counts of cells contained in a predetermined amount of blood, the classified counts being obtained from a differentiation counter.

16. The image filing system of claim 13, wherein the object being visually inspected is blood.

17. The image filing system of claim 13, wherein the image capturer includes a microscope portion for direct viewing of the object.

18. An image filing system comprising:
   an image capturer, for visual inspection of an object by directly viewing an object, and for capturing and converting an image of the visually inspected object into an image signal, and for outputting the image signal;
   a data base for storing a plurality of images together with attribute information of the images;
   a display for displaying an image;
   an input device for inputting an identification code relating to the visually inspected object and for inputting an instruction for instructing the image capturer to capture an image of the visually inspected object;
   a memory for storing information correlating the identification code to the attribute information; and
   a controller for receiving the image signal outputted from the image capturer, creating an image based on the received image signal, and controlling the display to display the created image,
   wherein the image capturer further comprises transfer means for transferring the image of the visually inspected object,
   the input device further comprises a function of designating a transfer direction of the transfer means, and
   the controller further controls the transfer means to transfer the image of the visually inspected object in the transfer direction designated by the input device.

19. The image filing system of claim 18, wherein the object being visually inspected is blood.

20. The image filing system of claim 18, wherein the image capturer includes a microscope portion for direct viewing of the object.

* * * * *